(12) United States Patent
Ronen et al.

(10) Patent No.: US 8,959,079 B2
(45) Date of Patent: Feb. 17, 2015

(54) METHOD AND SYSTEM FOR PROVIDING RELATIONSHIPS IN SEARCH RESULTS

(75) Inventors: Inbal Ronen, Haifa (IL); Erel Uziel, Haifa (IL); Sivan Yogev, Haifa (IL); Naama Zwerdling, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 12/568,685

(22) Filed: Sep. 29, 2009

(65) Prior Publication Data

US 2011/0078136 A1 Mar. 31, 2011

(51) Int. Cl.
G06F 17/30 (2006.01)

(52) U.S. Cl.
CPC ....... G06F 17/30864 (2013.01); Y10S 707/961 (2013.01)
USPC ..... 707/715; 707/796; 707/961; 707/E17.048

(58) Field of Classification Search
CPC ................................................ G06F 17/30864
USPC ........................... 707/796, 715, E17.048, 961
See application file for complete search history.

(56) References Cited

U.S. PATENT DOCUMENTS

| | | | |
|---|---|---|---|
| 7,437,676 B1 * | 10/2008 | Magdum et al. | 715/738 |
| 7,668,821 B1 * | 2/2010 | Donsbach et al. | 707/765 |
| 8,024,324 B2 * | 9/2011 | Amitay et al. | 707/715 |
| 8,244,668 B1 * | 8/2012 | Baltazar et al. | 707/608 |
| 2002/0022956 A1 * | 2/2002 | Ukrainczyk et al. | 704/9 |
| 2006/0042483 A1 * | 3/2006 | Work et al. | 101/91 |
| 2006/0149712 A1 * | 7/2006 | Kindsvogel et al. | 707/3 |
| 2006/0235873 A1 * | 10/2006 | Thomas | 707/102 |
| 2006/0242130 A1 | 10/2006 | Sadri et al. | |
| 2008/0140644 A1 | 6/2008 | Franks et al. | |
| 2008/0243799 A1 | 10/2008 | Rozich et al. | |
| 2009/0198675 A1 * | 8/2009 | Mihalik et al. | 707/5 |
| 2009/0228830 A1 * | 9/2009 | Herz et al. | 715/808 |
| 2009/0249355 A1 * | 10/2009 | Kaarela et al. | 719/313 |
| 2010/0161631 A1 * | 6/2010 | Yu et al. | 707/758 |
| 2012/0047186 A1 * | 2/2012 | Shadmon et al. | 707/803 |

OTHER PUBLICATIONS

Index (database), Wikipedia, Apr. 4, 2008, pp. 1-5.*
7 things you should know about Wikis, Jul. 2005, pp. 1-2.*

* cited by examiner

*Primary Examiner* — Albert Phillips, III (57) ABSTRACT

A method and system for providing relationships in search results are provided. The method includes indexing an entity in a search index as an entity index entry, the entity index entry including facets providing information on the entity type and related entities. Search results are obtained by a search engine in the form of ranked result entities, wherein the result entities include multiple types of entities. The method then includes retrieving index entries to determine relationships between search result entities and providing the relationships in search results. The method further includes, for each result entity, retrieving its entity index entry and cross-checking the facets of the retrieved entity index entry for other result entities.

20 Claims, 8 Drawing Sheets

METHOD AND SYSTEM FOR PROVIDING RELATIONSHIPS IN SEARCH RESULTS

FIELD OF THE INVENTION

This invention relates to the field of information retrieval. In particular, the invention relates to providing relationships in search results.

BACKGROUND OF THE INVENTION

Modern search applications return result sets comprised of different types of entities such as documents, photos, videos, people, tags and more. On one hand, this wealth of new information allows retrieval of results more fitting the searcher's needs. On the other hand, the searcher is simultaneously exposed to an often overwhelming amount of data.

In existing systems with results including more than one entity type, entities are usually grouped together by entity type and it is possible to narrow the search to only one entity type. For example, Google search (Google is a trade mark of Google Inc.) and Yahoo! universal search (Yahoo! Is a trade mark of Yahoo! Inc.) provide results by entity type.

SUMMARY OF THE INVENTION

According to a first aspect of the present invention there is provided a method for providing relationships in search results, comprising: indexing an entity in a search index as an entity index entry, the entity index entry including facets providing information on the entity type and related entities; obtaining search results in a search engine in the form of ranked result entities, wherein the result entities include multiple types of entities; retrieving index entries to determine relationships between search result entities; and providing the relationships in search results; wherein said indexing, obtaining, retrieving, and providing steps are implemented in either of: a) computer hardware configured to perform said indexing, obtaining, retrieving, and providing steps; or b) computer software embodied in a non-transitory, tangible, computer-readable storage medium.

According to a second aspect of the present invention there is provided a computer program product for providing relationships in search results, the computer program product comprising: a computer readable medium; computer program instructions operative to: index an entity in a search index as an entity index entry, the entity index entry including facets providing information on the entity type and related entities; obtain search results in a search engine in the form of ranked result entities, wherein the result entities include multiple types of entities; retrieve index entries to determine relationships between search result entities; and provide the relationships in search results; wherein said program instructions are stored on said computer readable medium.

According to a third aspect of the present invention there is provided a system for providing relationships in search results, comprising: a processor; a search index storing an entity index entry, the entity index entry including facets providing information on the entity type and related entities; a search engine for obtaining search results in the form of ranked result entities, wherein the result entities include multiple types of entities; a relationship determining mechanism for retrieving index entries to determine relationships between search result entities; and a display for providing the relationships in the search results; wherein any of said search index, search engine, relationship determining mechanism and display are implemented in either of computer hardware or computer software embodied in a non-tangible, computer-readable storage medium.

According to a fourth aspect of the present invention there is provided a system for providing relationships in search results, comprising: a display mechanism for displaying result entities; a selection mechanism for selecting a result entity; a look-up component for looking-up related entities to the selected result entity; and a highlighting mechanism for highlighting the related entities; wherein any of display mechanism, selection mechanism, look-up component and highlighting mechanism are implemented in either of computer hardware or computer software embodied in a non-tangible, computer-readable storage medium.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A search system is described where for each committed query the search engine returns not only the best relevant entities for the query, but also a mapping of the relations between the retrieved entities, where each relation can contain details on the relation characters.

As part of the described search system, different types of entities are collected with different types of relationships between them. These relationships are shown as part of the search results.

Figure 1:
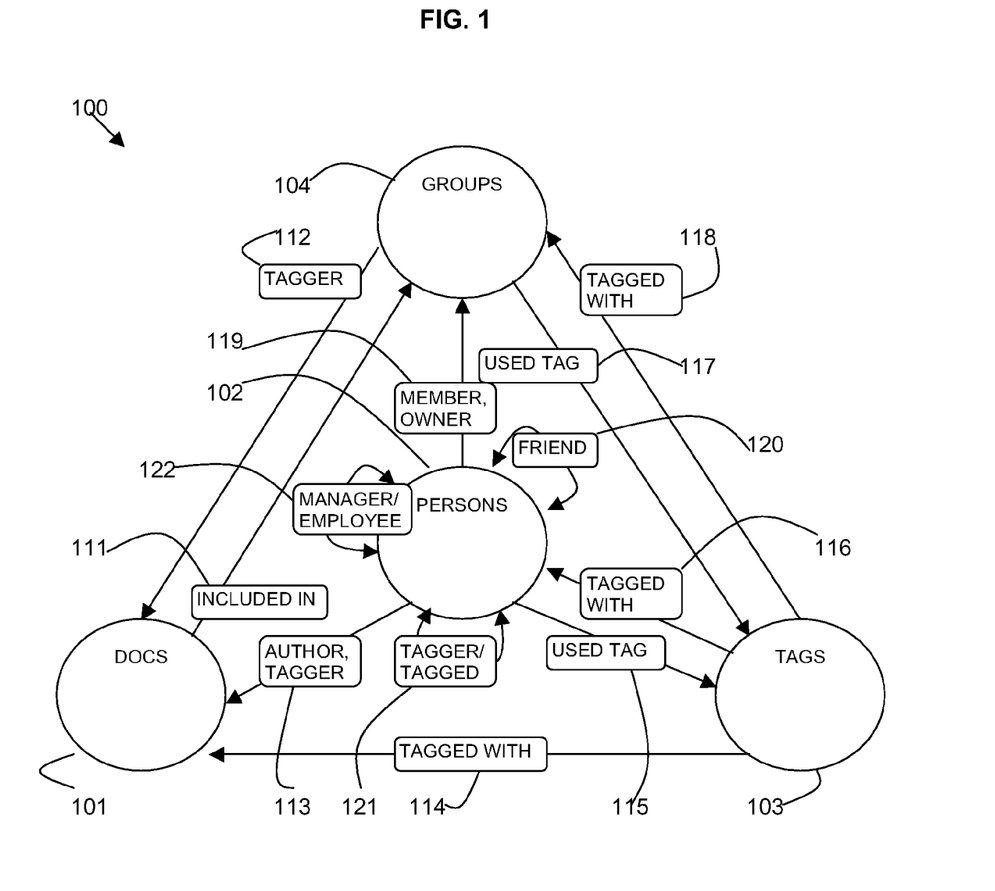
FIG. 1 is a schematic diagram of entities in search results and their relationships in accordance with the present invention.

FIG. 1 is a schematic diagram 100 illustrating different entity types and relationships between them. The entity types and relationships shown in FIG. 1 are examples and other entities and relationships may also be used in the described system.

Entities shown in FIG. 1 include documents 101, persons 102, tags 103, and groups 104 such as communities, wikis, activities, etc.

Relationships shown in FIG. 1 include the following.
Relationships between documents 101 and groups 104 include:
  a document included in 111 a group, or
  a group which is a tagger 112 of a document.
Relationships between documents 101 and persons 102 include:
  a person being an author, commenter, or tagger 113 of a document.
Relationships between documents 101 and tags 103 include:
  documents being tagged 114 with a tag.
Relationships between tags 103 and persons 102 include:
  a person using 115 a tag; and
  a person being tagged 116 with a tag.
Relationships between tags 103 and groups 104 include:
  a group using 117 a tag; and
  a group being tagged 118 with a tag.
Relationships between groups 104 and persons 102 include:
  a person being a member or owner 119 of a group.
Relationships between a person 102 and another person 102 include:
  a person being a friend 120 to another person;
  a person tagging or being tagged 121 by another person; and
  a person being a manager or employee 122 of another person.

Relationships between entities are handled in two phases, in indexing and in search. Relationships are stored as facets on each indexed document. During a search, all potential relationships are collected and matched to a list of configurable weighted relationships. The top scoring relationships are displayed with the search results.

Figure 2:
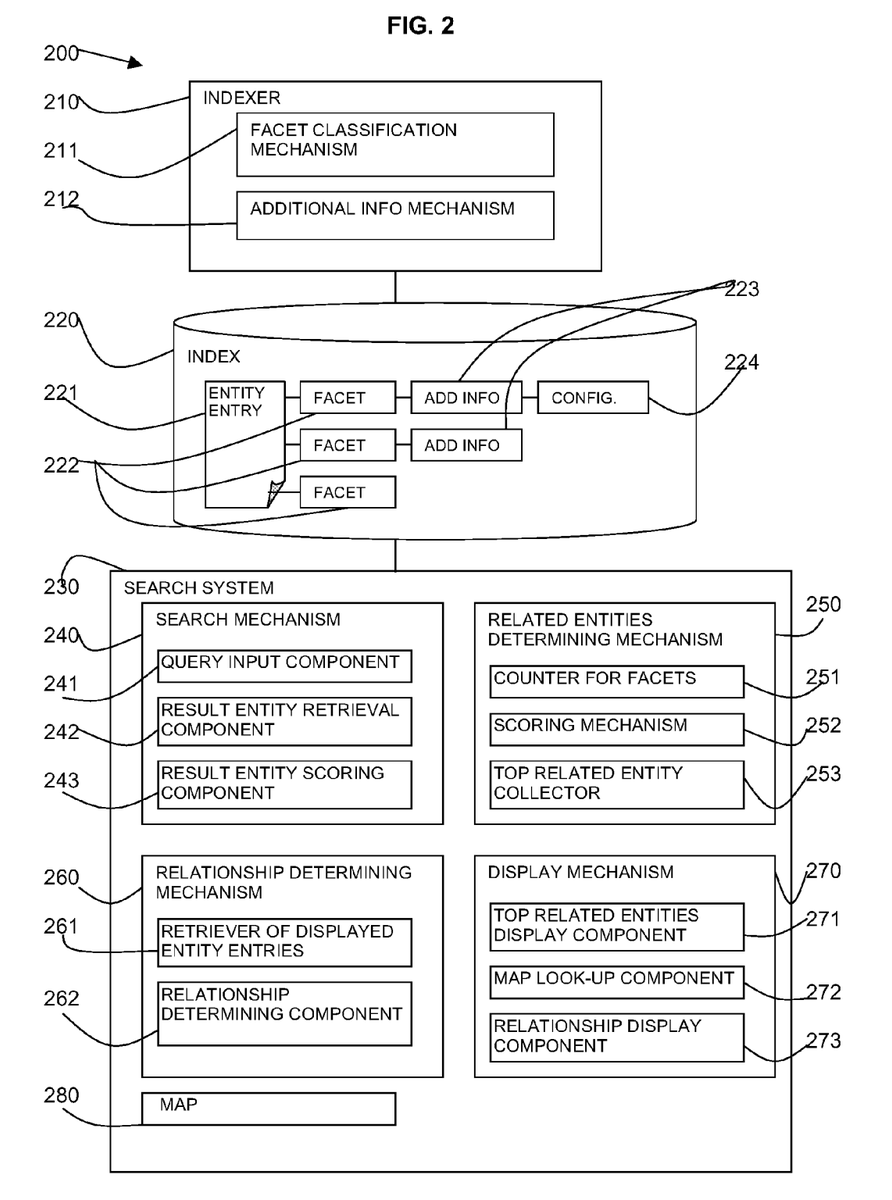
FIG. 2 is a block diagram of a system in accordance with the present invention.

Referring to FIG. 2, a block diagram shows the described system 200. The system 200 includes an indexer 210 for gathering information and indexing the information in a search index 220. The indexer 210 includes a faceted classification mechanism 211 for adding facets 222 to entity index entries 221 in the search index 220. The indexer 210 may also include an additional information mechanism 212 for adding additional information 223 to facets 222. The additional information 223 may include configuration files 224 and relationship type scores.

The system 200 includes a search system 230 including a search mechanism 240 with a query input component 241, a result entity retrieval component 242, and a result entity scoring component 243. The result entities may be different types of entities such as documents, photos, videos, people, tags, forums, blogs, wilds, etc.

The search system 230 also includes a related entities determining mechanism 250 including a counter 251 for each facet entry for a result entity, a scoring mechanism 252 for scoring related entities by facet count and result entity score, and a top related entity collector 253.

The search system 230 further includes a relationship determining mechanism 260 including a retriever 261 of entity index entries from the search index 220 for displayed entities in the form of result entities and related entities. The relationship determining mechanism 260 also includes a relationship determining component 262 for determining all relationships between displayed entities.

The search system 230 includes a display mechanism 270 including a top related entities display component 271, a map look-up component 272, and a relationship display component 273. A map 280 is provided with keys of result entities and values of related entities and the relationship description.

Figure 3:
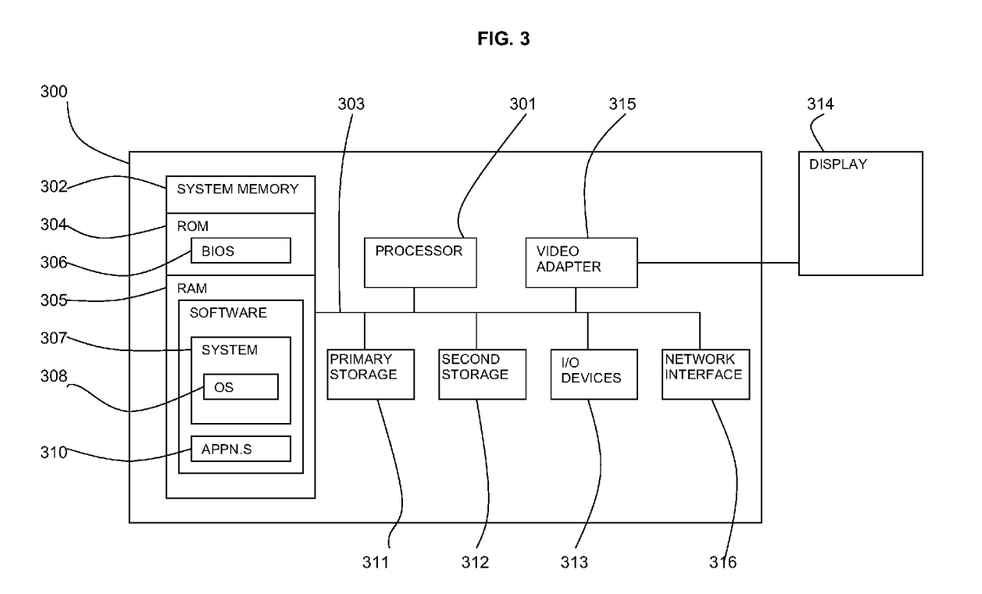
FIG. 3 is a block diagram of a computer system in which the present invention may be implemented.

Referring to FIG. 3, an exemplary system for implementing the indexer and the search system includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
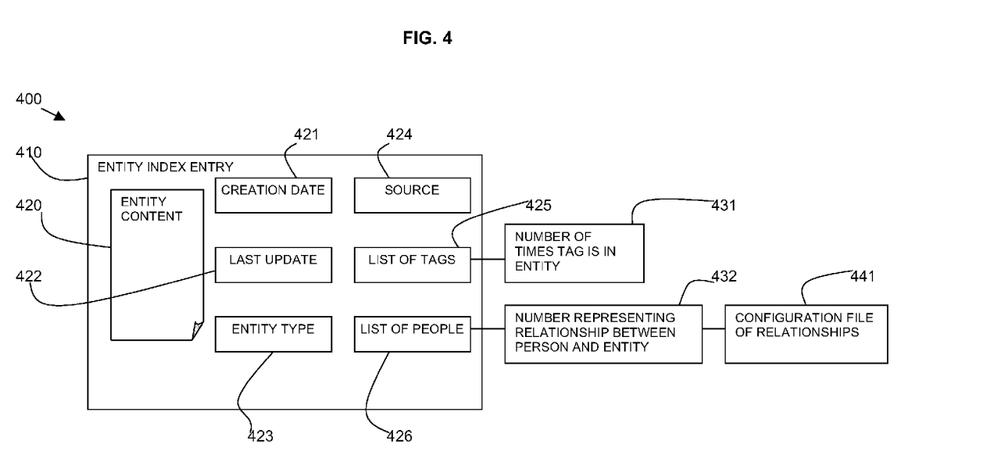
FIG. 4 is schematic representation of an index in accordance with an aspect of the present invention.

Referring to FIG. 4, a schematic diagram 400 shows an entity entry 410 in a search index. During indexing attribute fields are added to the indexed entries 410. The attribute fields are stored as facets of the entry 410. An entity entry 410 includes the entity content 420 and facets 421-426 such as the creation date 421, last update date 422, entity type 423, source 424, list of tags 425, list of persons 426. The entity type facet 423 can be, for example, 'Person', 'Document/Blog', 'Document/Patent', 'Document/Wiki', 'Tag', 'Group/Community', etc.

Each facet 421-426 may have additional information 430 and may have an associated configuration file 440.

For example, for each tag provided in the list of tags facet 425, additional information 431 is provided as a number which is the number of times that this tag appeared in the entity.

For each person facet 426, additional information 432 is provided as a 32 bit number which represents the relationships between the person and the entity. The list of possible relationships is stored in a configuration file 441 and each relationship has a defined ordinal between 0 to 31. For each person facet 426, one bit in the 32 bit number is assigned for each of the relationships (according to the relationship ordinal) making it possible to later retrieve the 32 bit number and find the exact list of relationships. The list of person relationships includes: author, commenter, member, employee, manager, tagger, friend, reader and sharer.

In one embodiment, an open source search engine Lucene (Lucene is a trade mark of Apache Software Foundation) is used with the extension of ILEL (IBM Lucene Extensions Library) open source library to provide support for facets.

Figure 5:
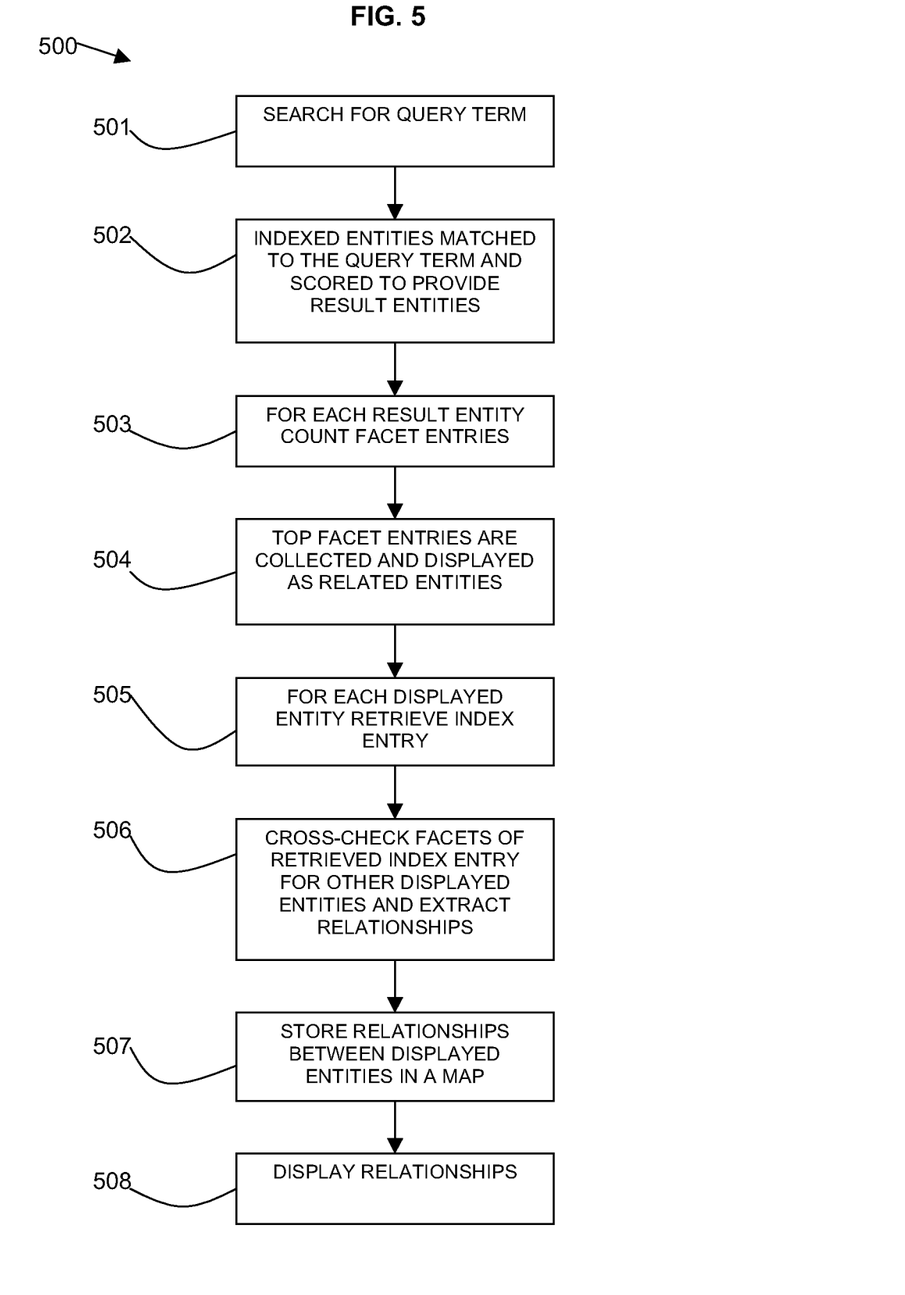
FIG. 5 is a flow diagram of a method in accordance with an aspect of the present invention.

The described system and method are used during a search phase. Referring to FIG. 5, a flow diagram 500 shows the described method.

A search query term is entered and a search carried out 501. Entities are matched 502 to the query term and scored to provide a ranked set of result entities. The result entities can optionally be ordered and displayed by entity type.

For each result entity a count of each facet entry is carried out 503 and scored by the result entity score. Top facet entries are collected 504 and displayed as related entities, for example, under "related people", "related tags", "source", etc.

For each displayed entity in the results (including result entities and related entities), the index entry is retrieved 505 from the search index. It is checked if any of the other displayed entities appears in the index entry as a facet and the relationships are extracted 506. For person facets as described above, the additional information is extracted in order to find the nature of the relationship.

The relationships between the displayed entities are stored in a map 507 and displayed 508 with the search results.

In one embodiment, the related entities are not displayed. The above method is carried out without the steps of counting facet entries 503 and collecting 504 and displaying related entities. A list of result entities is obtained with results of all types displayed in a single list without separating into different types. The index entries are retrieved from the search index for the result entities. The result entities are cross-checked to extract the relationships between the result entities.

During search the entity index entry facets are collected, for example, using the ILEL library. Date and source facets are counted for all matching documents.

Figure 6A:
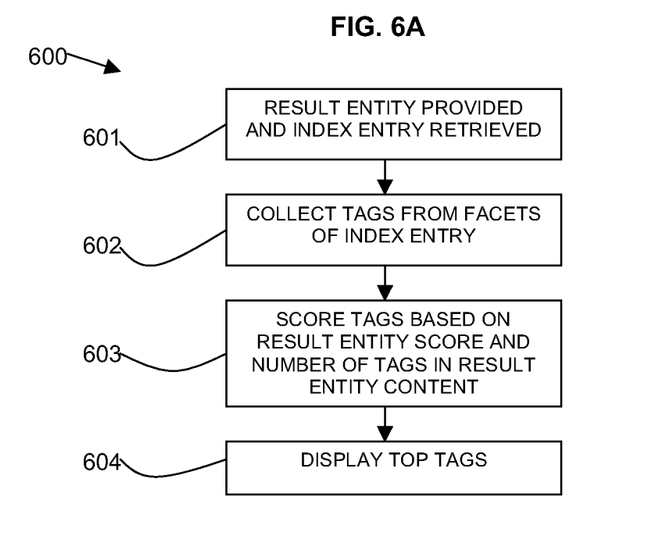
FIGS. 6A and 6B are flow diagrams of methods in accordance with further aspects of the present invention.

Referring to FIG. 6A, a flow diagram 600 shows an embodiment of the step 503 of FIG. 5 of counting a facet entry for each result entity. FIG. 6A shows the method of determining tags related to a result entity. A result entity is provided 601 and the index entry for the result entity retrieved. The tags are collected 602 from the facets of the index entry. The collected tags are scored 603 based on the result entity score (which is related to the search term) multiplied by the number of times the tag appeared in the result entity content. Only the top tags are displayed 604 in the tags section.

Figure 6B:
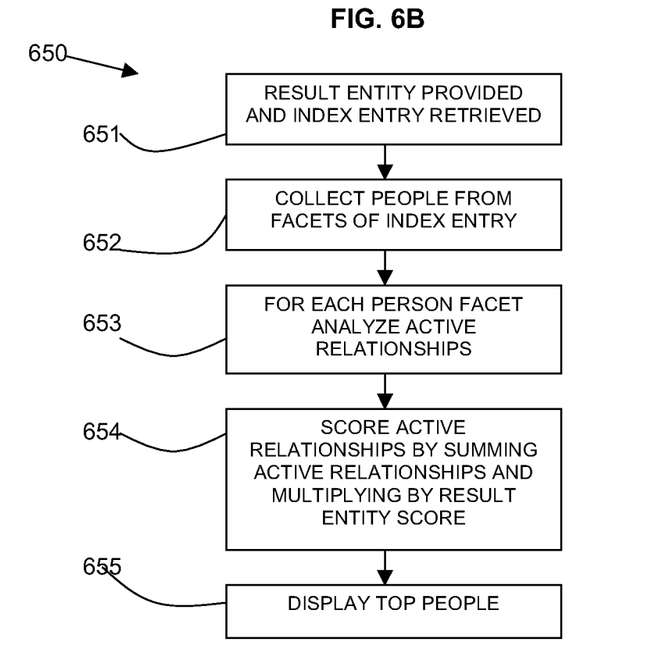

Referring to FIG. 6B, a flow diagram 650 shows an embodiment of the step 503 of FIG. 5 of counting a facet entry for each result entity. FIG. 6B shows the method of determining people related to a result entity. Person facets are treated in a similar manner to tag facets. A result entity is provided 651 and the index entry for the result entity retrieved. The people are collected 652 from the facets of the index entry. For each relationship there is a value in the configuration file which represents its value. For each person facet, the 32 bit number is analyzed 653 and all active relationships are found based on the active bits 654. The value of all active relationships is scored 654 by summing the active relationships and multiplying by the result entity score. Again, only the top related persons are displayed 655 in the related people section.

Documents may also be provided as facets and a section of related documents may be provided.

In order to display the displayed entities relationships, after the search engine provides the top documents, top persons, top tags and list of sources and dates, for each top related entity, the list of facets with their additional values are fetched and all relationships between this document and the different entities are found. For example, for each person facet there is also a person index entry which is fetched and the list of related tags is found in this entry.

These relationships are stored as a map. Each entity is a key in this map and the value is a list of related entities with the relationship description where such exists.

When a user hovers over an entity or selects the displayed entity in some way, a check is carried out to see if this entity appears in the map and if it does appear then the list of related entities is displayed or highlighted as required.

The following is a worked example, illustrating the described method. A user is searching for a term and want to receive the top 3 documents and the top 2 related persons.

The following documents match this term:

| Name | Document Score (related to the term) | Related persons with relationship (person facets) |
|---|---|---|
| D1 | 1 | P1-Author |
|    |   | P2-Commenter |
| D2 | 0.5 | P1-Reader |
| D3 | 0.5 | P3-Author |
| D4 | 0.3 | P3-Member, Tagger |
| D5 | 0.1 | P2-Reader |

Each relationship type has a configurable weight. For example:

| Relationship | Weight |
|---|---|
| Author | 1 |
| Commenter | 0.5 |
| Reader | 0.2 |
| Member | 0.2 |
| Tagger | 0.1 |

So the persons will receive the following scores for this query:
P1=>1*1+0.5*0.2=1.1 (D1 scores of 1 multiplied by the Author weight of 1, plus D2 score of 0.5 multiplied by the Reader weight of 0.2).
P2=>1*0.5+0.1*0.2=0.52
P3=>0.5*1+0.3*(0.2+0.1)=0.59

Therefore the visible results are the documents D1, D2 and D3 and the persons P1 and P2.

For each of these five entities relationships are checked between the visible results and these relationships are mapped:
P1 and P3 also have an entry in the index, and from this entry it is found that they are both friends in a social network application.

| Key | Value |
|---|---|
| D1 | P1 (Author) |
| D2 | P1 (Reader) |
| D3 | P3 (Author) |
| P1 | D1 (Author), D2 (Author), P3 (Friend) |
| P3 | D3 (Author), P1 (Friend) |

So these five entities can be displayed with the relationships between them.

Figure 7A:
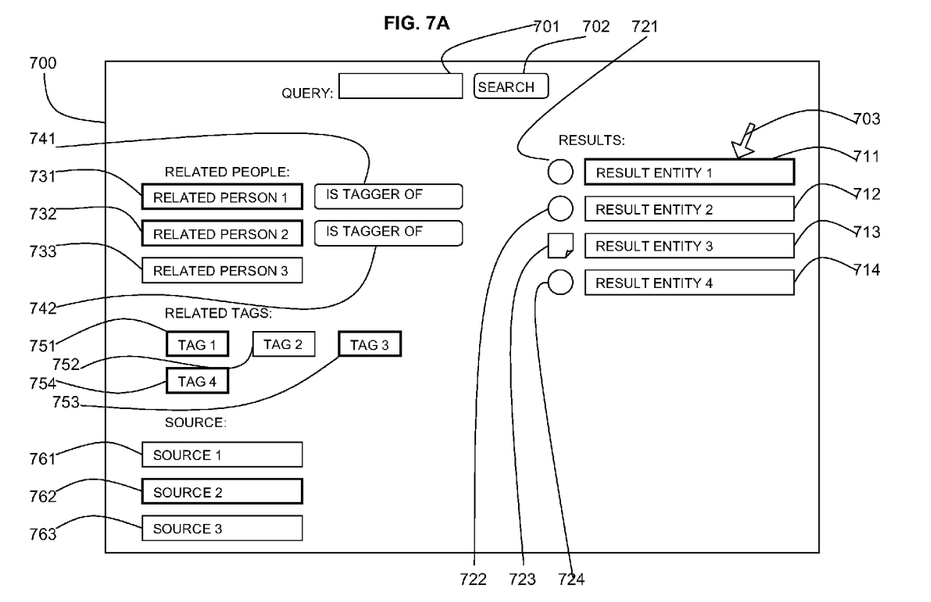
FIGS. 7A and 7B are representations of displays of search results in accordance with aspects of the present invention.
Figure 7B:
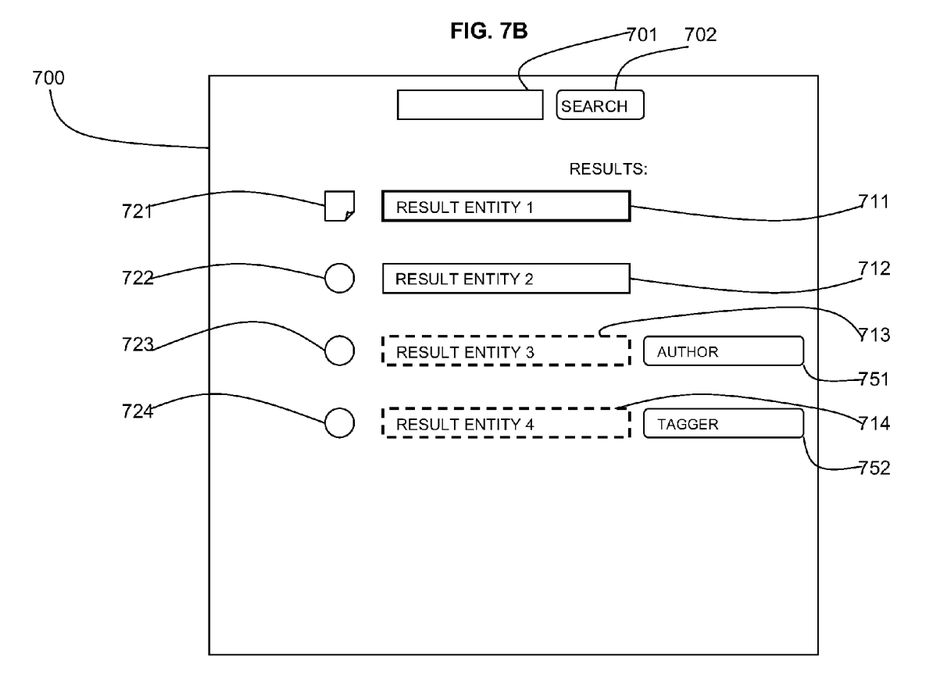

Referring to FIGS. 7A and 7B, embodiments of displays of search results are shown. In both figures, a display 700 shows a query input box 701 and a search activate button 702. Result entities 711-714 are listed and may include an icon 721-724 indicating the type of entity the result entity is. For example, a document, an image, a video, a blog, etc.

A result entity 711 can be chosen, for example, by a pointer 703 hovering over it and is highlighted (shown as a bold outline) or distinguished from the other result entities in some way.

In FIG. 7A, the display 700 includes displayed related entities. The related entities include related people 731-733. Related entities 731-732 with a relationship to a selected result entity 711 are highlighted when the result entity 711 is chosen. A tool tip is displayed 741, 742 adjacent the related entity 731-732 providing details of the relationship. In this example, both people tagged this document.

The displayed related entities also include related tags 751-754. Again, tags 751, 753, 754 are highlighted if they relate to a chosen result entity 711.

The displayed related entities also include sources 761-763 of the result entities. Sources 762 are highlighted if they relate to a chosen result entity 711.

Another section which is not shown in FIG. 7A, is the date section in which the date category of the selected result entity 711 is shown.

In FIG. 7B, the result entities 711-714 are given in a single ranked list. When hovering over a certain result entity 711 in the result set, that entity is strongly highlighted. All other entities 723, 724 in the result set that are related to the hovered entity 711 are weakly highlighted. In addition, the characteristics of the relationship are presented 773, 774 next to each of the related entities 723, 724 (the weakly highlighted ones).

For example, the chosen result entity 711 may be a document shown by the icon 721 and the related result entities 723, 724 may be people one of which is the author as shown in the relationship 773 and one of which is a tagger of the document 711 shown in the relationship 774.

A further embodiment of a display is a graph representation. The different entities are represented as nodes in a graph, and a relationship between two entities is depicted through an edge connecting the two corresponding nodes. The nodes are located on the screen so that the number of crossing edges is minimal. Each node contains a snippet of the entity it represents, and while hovering over the node a pop-up presents more data on the entity. Edges can have different strength to reflect the relation strength and may also vary in color to differentiate relation types, and when hovering over the edge the relation characteristics are shown.

A search system with relationship results may be provided as a service to a customer over a network.

The invention can take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for providing relationships in search results, comprising:
   providing a search index identifying entities, and relations between the entities stored as facet entries for the entities;
   matching entities in said search index with a user-provided query term;
   scoring an extent to which the matching entities match the user-provided query term;
   obtaining in a search engine, search result entities including:
      a plurality of entities matching the user-provided query term with highest scores, and
      related entities selected based on a count of the related entities in facet entries of the matching entities;
   retrieving index entries from the search index to determine relationships between the obtained search result entities, and to store the relationships in a map;
   providing the entities of the search results, including the entities matching the query term and the facet entities related to the matching entities, on a display; and
   indicating on the display pairs of displayed search result entities identified in the index as related;
   wherein said obtaining, retrieving, and providing steps are implemented in either of:
   a) computer hardware configured to perform said obtaining, retrieving, and providing steps; or
   b) computer software embodied in a non-transitory, tangible, computer-readable storage medium.

2. The method of claim 1, wherein obtaining the search results comprises obtaining result entities which match the user-provided query term and related entities which are indicated in the index as related to at least one of the result entities.

3. The method of claim 1, wherein providing the search results comprises indicating entities related to a displayed specific entity when a user pointer hovers over the specific entity on the display.

4. The method of claim 3, wherein indicating entities related to a displayed specific entity comprises highlighting the related entities.

5. The method of claim 1, wherein indicating pairs of displayed search result entities identified in the index as related comprises providing on the display details of the relationships.

6. The method of claim 1, wherein providing the entities of the search results comprises displaying a graph in which entities are represented by nodes and relationships are represented by edges.

7. The method of claim 6, wherein the edges are displayed with colors which represent the types of the relationships they represent.

8. The method of claim 6, wherein the edges are displayed with strengths which represent the strengths of the relationships they represent.

9. The method of claim 1, wherein the index entries include indications of a plurality of different types of relationships, including tagger and author relationships.

10. The method of claim 1, wherein indicating on the display pairs of displayed search result entities identified in the index as related comprises providing indications of relationships between entities of different types which match the query term and are indicated in the index as related, the types including at least two of: documents, photos, videos, people, tags, forums, community, blogs and wikis.

11. The method of claim 1, wherein obtaining the search result entities comprises obtaining entities of multiple types, the types including at least two of: documents, photos, videos, people, tags, forums, community, blogs and wilds.

12. The method of claim 1, wherein providing the indications of determined relationships between search result entities comprises providing indications of relationships between entities determined to match the query term with highest scores.

13. A computer program product for providing relationships in search results, the computer program product comprising:
a non-transitory computer readable medium;
computer program instructions operative to:
provide a search index including entities, and relations between the entities stored as facet entries for the entities;
match entities in said search index with a user-provided query term;
scoring an extent to which the matching entities match the user-provided query term;
obtain search result entities including:
a plurality of entities, matching the user-provided query term with highest scores, and
related entities selected based on a count of the related entities in facet entries of the matching entities;
retrieve index entries from the search index to determine relationships between the obtained search result entities, and store the relationships in a map; and
provide the entities of the search results, including the entities matching the query term and the facet entities related to the matching entities, on a display along with indications of relationships between pairs of displayed search result entities, determined from the index;
wherein said program instructions are stored on said computer readable medium.

14. A system for providing relationships in search results, comprising:
a processor;
a search index storing a plurality of entity index entries, each entity index entry including facets providing information on the entity type and related entities;
a search engine for determining a plurality of entities in said search index that match a user-provided query term along with scores of an extent to which the entities match the user-provided query term, obtaining search result entities, which include a plurality of entities matching the user provided query term, with highest scores and related entities selected based on a count of the related entities in facet entries of the matching entities;
a relationship determining mechanism for retrieving index entries to determine relationships between the obtained search result entities and storing the relationships in a map and;
a display for providing the search results along with the determined relationships between pairs of displayed search result entities determined from the index.

15. A search engine, comprising:
an input device configured to receive search query terms;
a search index identifying entities and relations between the entities;
a display; and
a processor configured to determine a plurality of entities that match a search query term from the input device along with scores of an extent to which the entities match the query term, to obtain search result entities including a plurality of entities matching the search query term from the input device with highest scores and related entities selected based on a count of the related entities in facet entries of the matching entities in the search index, to determine and store a map of relationships appearing in the search index between the obtained search result entities, and to present the search results on the display along with indications of the determined relationships between pairs of displayed search result entities.

16. The search engine of claim 15, wherein the processor is configured to obtain the search results in a manner such that the search results for a search query term include entities of a plurality of different types that match the search query term, the types including at least two of: documents, photos, videos, people, tags, forums, community, blogs and wikis.

17. The search engine of claim 15, wherein the processor is configured to present on the display details of the relationships with the indications of the relationships.

18. The search engine of claim 15, wherein the processor is configured to present the search results as a graph in which nodes represent search result entities and edges represent relationships between entities.

19. The search engine of claim 18, wherein the processor is configured to present the edges with a strength or color which depends on an attribute of the relationship represented by the edge.

20. The search engine of claim 15, wherein the processor is configured to present the search results in a manner such that displayed entities related to a specific entity are indicated on the display responsive to a user pointer being brought to indicate a specific entity on the display.

* * * * *